Patented Apr. 5, 1938

2,113,146

UNITED STATES PATENT OFFICE 2,113,146

MANUFACTURE OF ARYLAMINONAPHTHALENE DERIVATIVES

Paul Virck and Max Schulze, Wolfen, kreis Bitterfeld, Germany, assignors to General Aniline Works, Inc., New York, N. Y., a corporation of Delaware No Drawing. Application September 16, 1936, Serial No. 101,082. In Germany October 26, 1935

6 Claims. (Cl. 260—128)

In U. S. Patent No. 1,857,541 there is described the manufacture of arylaminonaphthalene derivatives by treating an amino- or hydroxynaphthalene derivative, except a sulfonic acid or a carboxylic acid and the 1.8-diamino-, dihydroxy- or aminohydroxy-derivative, with an aminohydroxy- or an aminoalkoxybenzene or a nuclear substitution product thereof in presence of a dilute sodium bisulfite liquor at a high temperature. Temperatures of about 100° to about 120° C. are prescribed, the duration of reaction being in general more than 24 hours. For instance, the 2-(4'-hydroxyphenyl)-aminonaphthalene is made from 4-amino-1-hydroxybenzene and 2-hydroxynaphthalene at a temperature of about 115° to about 120° C. and with a duration of reaction of about 27 hours. In the United States Patent No. 1,857,541 it is stated that the same reaction proceeds in the course of 12 hours if the temperature is raised to 140 to 145° C. It has been found, however, that on a large scale the reaction is accompanied by a decomposition of the sodium bisulfite to acid sulfate with a separation of sulfur, particularly at a high temperature of reaction.

The present invention is based on the observation that the duration of the reaction may be essentially shortened and the decomposition of the sodium bisulfite to a great extent avoided by adding to the reaction mixture neutral sodium sulfite or an alkali which can form with bisulfite the neutral sulfite. It suffices to use small proportions, in general 10 to 15 per cent. of the quantity of bisulfite used. It is possible under this condition to conduct the condensation at an essentially higher temperature than hithereto, for example at 155 to 160° C., so that the duration of the process is considerably shortened.

This effect of neutral sulfite is surprising. According to Bucherer (Lehrbuch der Farbenchemie, 2nd Edition, 1921, page 201), a reaction cannot be produced between a phenol or naphthol and an aminophenol in presence of sodium sulfite, since the sulfurous acid ester of the naphthol produced as an intermediate product, is decomposed by the formation of alkali.

The following examples illustrate the invention, the parts being by weight:—

*Example 1.*—In an enamelled, closed stirring vessel are stirred together for 18 hours at 117° C. 144 parts of 2-hydroxynaphthalene, 160 parts of 4-amino-1-hydroxy-benzene and 4200 parts of sodium bisulfite lye of 20° Bé., and 84 parts of sodium sulfite. After the mass has been cooled to 70° C., the 2-(4'-hydroxyphenyl)-aminonaphthalene produced is pressed and washed hot. The yield amounts to 225 parts of the 2-(4'-hydroxyphenyl)-aminonaphthalene. The filtrate, which contains the excess of 4-amino-1-hydroxybenzene, is returned to the process.

*Example 2.*—A lead-lined stirring vessel is charged with 374 parts of sodium bisulfite in 1232 parts of water, 144 parts of 2-hydroxynaphthalene, 51 parts of neutral sodium sulfite and 138 parts of 4-amino-1-hydroxybenzene are introduced, and the whole is heated for 5 hours at 160° C. The finished condensation product is cooled to 80 to 90° C. and filtered. The filter cake is washed with a small quantity of hot water. The yield amounts to 225 to 230 parts of 2-(4'-hydroxyphenyl)-aminonaphthalene.

*Example 3.*—In a lead-lined closed stirring vessel there are stirred together for about 5 hours at 150° C. 300 parts of 1-hydroxynaphthalene, 288 parts of 4-amino-1-hydroxybenzene and a solution of 655 parts of sodium bisulfite and 45 parts of calcined sodium carbonate in 2200 parts of water. The product of the reaction is filtered hot and washed with hot water. There are obtained 480 to 490 parts of 1-(4'-hydroxyphenyl)-aminonaphthalene which, after recrystallization, melts at 91° C.

*Example 4.*—160 parts of 2.7-dihydroxynaphthalene and 260 parts of 4-amino-1-hydroxybenzene are added to a solution of 655 parts of sodium bisulfite in 2200 parts of water and the mixture is stirred, while adding 45 parts of calcined sodium carbonate, for about 8 hours at 150° C. The precipitated product is filtered hot, stirred with hot sodium carbonate solution and, after filtration, washed with hot water. The yield amounts to 342 parts of dry 2.7-di-(4'-hydroxyphenylamino)-naphthalene of melting point 249 to 250° C.

*Example 5.*—A mixture of 325 parts of 4-amino-1-methoxybenzene, 300 parts of 1-hydroxynaphthalene, 655 parts of sodium bisulfite, 45 parts of calcined sodium carbonate and 2200 parts of water is heated for 5 hours at 150° C. in a lead-lined vessel under pressure and while stirring. After cooling, the product of reaction which has separated is filtered and washed. The yield amounts to 435 parts of 1-(4-methoxyphenyl)-aminonaphthalene. After treatment with hot dilute caustic soda lye the product melts at 110° C.

It is obvious that our invention is not limited to the foregoing examples or to the specific details given therein. In these examples hydroxy compounds of naphthalene are mentioned as starting materials to be condensed with an aminohydroxybenzene or an alkyl ether thereof. It is well known in the art that the "Bucherer-reaction", viz.—the condensation of aminoaryl compounds with hydroxyaryl compounds in the presence of bisulfite liquor can be modified by employing the aminoaryl compounds which correspond to the hydroxyaryl compounds. Thus, in the present case, the hydroxynaphthalenes in the foregoing examples may be substituted by the corresponding amino compounds and since in this condensation hydroxynaphthalenes and aminonaphthalenes are complete equivalents, always the same end products are obtained by such a modification.

What we claim is:—

1. In the process of condensing in the presence of a bisulfite liquor an amino benzene of the general formula

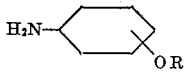

wherein R is a member of the group consisting of hydrogen and alkyl, with a naphthalene compound of the general formula

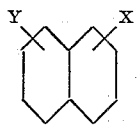

wherein X is a member of the group consisting of OH and $NH_2$ and Y is a member of the group consisting of H, OH and $NH_2$, the step which comprises carrying out the condensation in the presence of a further amount of neutral sodium sulfite.

2. In the process of condensing in the presence of a bisulfite liquor an amino benzene of the general formula

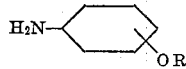

wherein R is a member of the group consisting of hydrogen and alkyl, with a naphthalene compound of the general formula

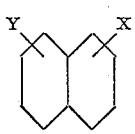

wherein X is a member of the group consisting of OH and $NH_2$ and Y is a member of the group consisting of H, OH and $NH_2$, the step which comprises carrying out the condensation in the presence of a further amount of neutral sodium sulfite which is about 10 to about 15 per cent. of the quantity of bisulfite used.

3. In the process of condensing in the presence of a bisulfite liquor an amino benzene of the general formula

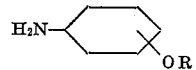

wherein R is a member of the group consisting of hydrogen and alkyl, with a naphthalene compound of the general formula

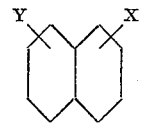

wherein X is a member of the group consisting of OH and $NH_2$ and Y is a member of the group consisting of H, OH and $NH_2$, the step which comprises carrying out the condensation in the presence of a further amount of neutral sodium sulfite which is about 10 to about 15 per cent. of the quantity of bisulfite used, at a temperature of about 155 to about 160° C.

4. In the process of condensing in the presence of sodium sulfite paraaminophenol with a naphthalene compound of the general formula.

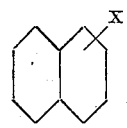

wherein X is a member of the group consisting of OH and $NH_2$, the step which comprises carrying out the condensation in the presence of a further amount of neutral sodium sulfite which is about 10 to about 15 per cent. of the quantity of bisulfite used.

5. In the process of condensing paraaminophenol with 1-hydroxynaphthalene in the presence of sodium bisulfite, the step which comprises carrying out the condensation in the presence of a further amount of neutral sodium sulfite which is about 10 to about 15 per cent. of the quantity of bisulfite used.

6. In the process of condensing paraaminophenol with 2-hydroxynaphthalene in the presence of sodium bisulfite, the step which comprises carrying out the condensation in the presence of a further amount of neutral sodium sulfite which is about 10 to about 15 per cent. of the quantity of bisulfite used.

PAUL VIRCK.
MAX SCHULZE.